J. S. WILLIAMS.
Combined Spading and Seeding Machine.

No. 210,387. Patented Nov. 26, 1878.

Witnesses:
James Breckinridge
Frank J. Salisbury

Inventor:
John S. Williams

UNITED STATES PATENT OFFICE.

JOHN S. WILLIAMS, OF CHICAGO, ILLINOIS.

IMPROVEMENT IN COMBINED SPADING AND SEEDING MACHINES.

Specification forming part of Letters Patent No. 210,387, dated November 26, 1878; application filed July 11, 1878.

*To all whom it may concern:*

Be it known that I, JOHN S. WILLIAMS, of Chicago, in the county of Cook and State of Illinois, have invented certain new and useful Improvements in Combined Spading and Seeding Machines; and I do hereby declare the following to be a full, clear, and exact description thereof, reference being had to the accompanying drawings and to the letters of reference marked thereon.

The nature of my invention consists in the construction and arrangement of a combined spading and seeding machine, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
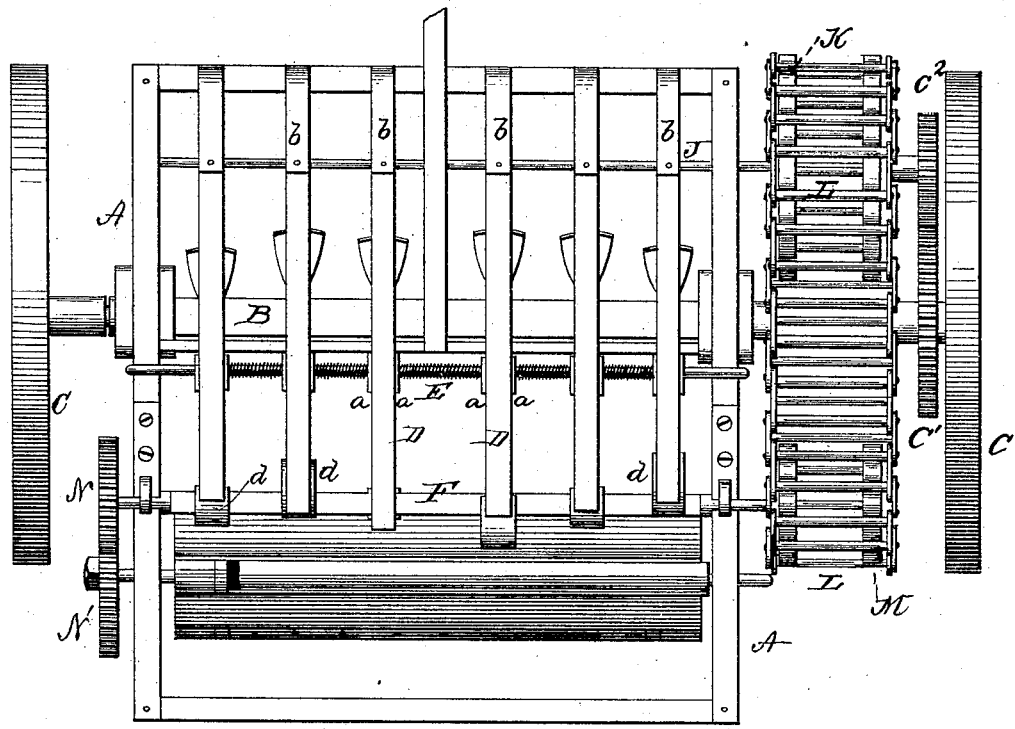
Figure 2:
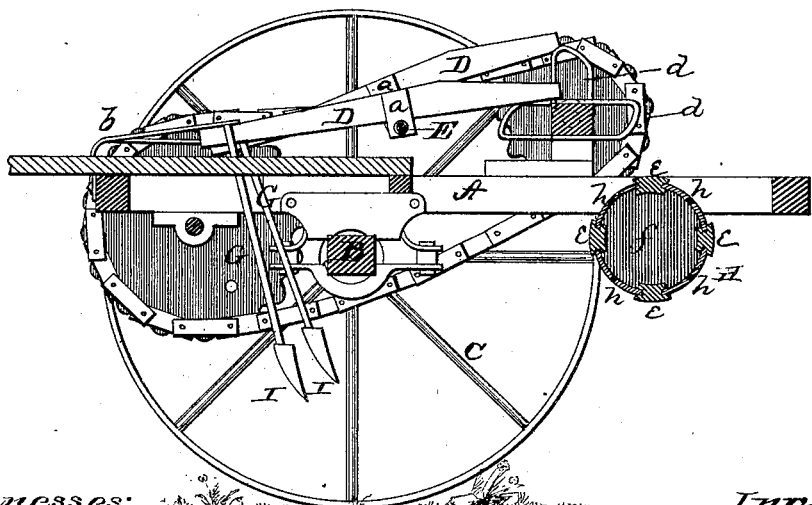

Figure 1 is a plan view of my machine. Fig. 2 is a transverse vertical section of the same.

A represents the frame of the machine secured on an axle-tree, B, upon the ends of which are the main or driving wheels C C. E is an elevated rod or shaft having its ends turned downward and secured to the frame. To this shaft or rod are pivoted a series of walking-beams, D D, by means of metal plates $a$ fastened to the sides of said beams and projecting sufficiently far below them to have the rod or shaft E pass through their lower ends.

The front end of each beam D has secured to it one end of a spring, $b$, the other end of which is turned downward and secured to the forward end of the frame A. The rear end of each beam D is operated by means of cams $d\ d$ secured upon a rotating beam, F, in the rear part of the main frame.

To the front end of each beam D is secured a shank or standard, G, having a spade, I, secured at its lower end. When the machine is in motion the beam F rotates and the cams $d$ raise the rear ends of the walking-beams D, so as to throw the spades I down into the ground, and as soon as the cams $d$ pass beyond the beams D the springs $b$ return said beams and spades to their former position.

It will of course be understood that the cams $d$ are set at varying angles on the beam F, so that the spades will act irregularly—that is to say, not all at one time.

Under the rear portion of the main frame is hung a seed-cylinder, H, which is constructed of two circular heads, $f$, connected by four longitudinal bars, $e\ e$, having grooves along their edges, into which are sprung curved plates $h$. These plates are perforated for the passage of the seed, and one plate, or a part of one plate, forms a slide for the admission of seed into the cylinder. This cylinder rotates and scatters the seed over the ground just spaded by the spades I in front.

The mechanism for operating the parts is as follows: On one of the driving-wheels C is a cog-wheel, $C^1$, which meshes with a similar wheel, $C^2$, on the end of a shaft, J, which has its bearings in the forward part of the main frame. On this shaft J is secured a double chain-wheel, K, around which is passed a chain, L, composed of links and rods, as shown. This chain also passes around a double chain-wheel, M, secured on one of the journals of the cam-beam F. On the opposite journal of this beam is a cog-wheel, N, meshing with a similar wheel, N', on the journal of the seed-cylinder H. By these means the rotating parts obtain an even and uniform motion during the operation of the machine.

Having thus fully described my invention, what I claim as new, and desire to secure by Letters Patent, is—

1. The combination of a series of spades, forced by a positive motion into the ground, through the medium of a rotating shaft having cams attached thereto, and retracted by springs, and a rotating seed-cylinder, substantially as herein set forth.

2. The combination of the walking-beams D, provided with the shanks G and spades I, the springs $b$, and the rotating beam F, with cams $d$ secured thereon, substantially as and for the purposes herein set forth.

3. The seed-cylinder H, constructed of the heads $f$, grooved bars $e$, and curved perforated metallic plates $h$ sprung into the grooves on the bars $e$, substantially as herein set forth.

JOHN S. WILLIAMS.

Witnesses:
JAMES BRECKENRIDGE,
FRANK J. SALISBURY.